United States Patent [19]

Przybyla

[11] 4,034,140
[45] July 5, 1977

[54] HEAT-CURABLE SILICONE ELASTOMERS HAVING UNPRIMED ADHESION

[75] Inventor: Richard L. Przybyla, Midland, Mich.

[73] Assignee: Dow Corning Corporation, Midland, Mich.

[22] Filed: July 31, 1975

[21] Appl. No.: 600,692

[52] U.S. Cl. .......................... 428/447; 260/37 SB; 260/825; 427/387

[51] Int. Cl.² .................... C08L 83/06; B05D 3/02

[58] Field of Search ................... 260/825, 37 SB; 427/387; 428/447

[56] References Cited

UNITED STATES PATENTS

| | | | |
|---|---|---|---|
| 3,035,016 | 5/1962 | Bruner | 260/37 SB |
| 3,077,465 | 2/1963 | Bruner | 260/37 SB |
| 3,264,258 | 8/1966 | Ceyzeriat | 260/37 SB |
| 3,274,145 | 9/1966 | Dupree | 260/46.5 R |
| 3,293,204 | 12/1966 | Smith | 260/37 SB |
| 3,296,161 | 1/1967 | Kulpa | 260/37 SB |
| 3,341,489 | 9/1967 | Simpson | 260/37 SB |
| 3,398,043 | 8/1968 | Youngs | 260/825 |
| 3,474,064 | 10/1969 | Hittmaiv | 260/37 SB |
| 3,647,917 | 3/1972 | Schulz | 260/37 SB |
| 3,667,993 | 6/1972 | Stevenson | 427/387 |
| 3,671,483 | 6/1972 | Young | 260/33.6 SB |
| 3,701,753 | 10/1972 | Shaw | 260/825 |
| 3,730,932 | 5/1973 | De Zuba | 260/37 SB |
| 3,769,253 | 10/1973 | Stevenson | 260/37 SB |
| 3,772,066 | 11/1973 | Clark | 427/387 |
| 3,772,122 | 11/1973 | Young | 428/447 |
| 3,794,612 | 2/1974 | Plueddemann | 260/37 SB |
| 3,794,694 | 2/1974 | Chadha | 260/37 SB |
| 3,813,364 | 5/1974 | De Zuba | 260/37 SB |

Primary Examiner—James R. Hoffman
Attorney, Agent, or Firm—George A. Grindahl

[57] ABSTRACT

Heat-curable elastomeric compositions having unprimed adhesion to a substrate are obtained by mixing from 0.1 to 10.0 parts by weight of a room-temperature-curable silicone elastomer stock having silicon-bonded acetoxy radicals with 100 parts by weight of an organic-peroxide-curable silicone rubber.

15 Claims, No Drawings

HEAT-CURABLE SILICONE ELASTOMERS HAVING UNPRIMED ADHESION

BACKGROUND OF THE INVENTION

1. Field of the Invention

The present invention relates to heat-curable organopolysiloxane compositions which exhibit improved adhesion to unprimed substrates.

2. Description of the Prior Art

The problem of adhering heat-curable or cured organopolysiloxane elastomeric compositions to various substrates is nearly as old as the silicone art itself. One solution to this problem has been to treat the surface of the substrate with a reagent such as a strong acid to render the treated surface more receptive in the adhering process. Another solution to this problem has been to prime a surface of the substrate with an adhesion-promoting primer composition and to subsequently apply the heat-curable or cured organopolysiloxane composition to the resulting primed surface. Considerable effort has been devoted to this primer method and significant progress has been made. However, many of the primer compositions that are used in the organosilicon elastomer art are difficult or inconvenient to prepare. The need of apply a primer composition to a substrate in a separate step is also, in many cases, inconvenient and time-consuming.

It is known to add certain adhesion-promoting materials to peroxide-curable organopolysiloxane compositions to obtain better adhesion of the organopolysiloxane composition to an unprimed substrate. U.S. Pat. No. 3,730,932 to DeZuba, et al. teaches a self-bonding, heat-curable silicone rubber composition comprising a diorganopolysiloxane polymer, a curing catalyst and certain maleates and/or silymaleates. U.S. Pat. No. 3,794,612 to Edwin P. Plueddemann teaches the addition fo diallylphthalate, alone or in combination with vinylor allyl-substituted trialkoxysilanes, to curable silicone rubber compositions to improve the adhesion of the elastomer to substrates such as wood, metal and plastics. U.S. Pat. No. 3,813,364 to DeZuba, et al. teaches a self-bonding, heat-vulcanizable silicone rubber composition comprising an organopolysiloxane polymer, a curing catalyst and an additive selected from cyanurates, isocyanurates, silyl-cyanurates and silyl-isocyanurates.

It is also known to add certain olefinicallyunsaturated organosilicon materials to heat-curable oganopolysiloxane compositions to improve the curing process thereof. Thus, U.S. Pat. No. 3,341,489 to Simpson claims a composition curable from 80° to 650° C. comprising an organopolysiloxane polymer having a viscosity of at least 100,000 centipoise at 25° C., a filler, a peroxide curing catalyst and an olefinically unsaturated organosilane of the formula $$R'-\underset{\underset{R''_b}{|}}{Si}-X_c$$

wherein R' is an olefinically unsaturated monovalent hydrocarbon radical, R" is hydrogen or a monovalent hydrocarbon radical free of olefinic unsaturation, X is alkoxy, alkoxyalkoxy, alkoxyaryloxy or acyloxy and c is an integer from 1 to 3.

Room-temperature-curing organopolysiloxane elastomers have found utility in the marketplace because they are different from and complementary to the heat-curing silicone rubber compositions. It is unexpected to form a mixture comprising an organic-peroxide-curable silicone rubber composition and a room-temperature-curable silicone elastomer to obtain a heat-curable silicone rubber composition having improved unprimed adhesion.

SUMMARY OF THE INVENTION

An object of this invention is to provide a heat-curable organopolysiloxane composition that has improved adhesion to unprimed surfaces when being cured in contact with an unprimed surface. Another object of this invention is to provide a heat-curable organopolysiloxane composition having improved unprimed adhesion which is convenient to prepare.

These and other objects will be obvious to one skilled in the art upon reading the following description of the invention. This invention relates to a self-bonding composition, heat-curable to the elastomeric state, obtained by mixing components comprising an organic-peroxide-curable organopolysiloxane composition, stable in the presence of moisture and a room-temperature-curable organopolysiloxane composition, stable in the absence of moisture.

By the terms "self-bonding" and "unprimed adhesion" it is meant that the heat-curable silicone rubber composition adheres to a substrate, after being cured in contact with the substrate, without the need for priming the substrate prior to applying the composition.

DESCRIPTION OF THE INVENTION

There is provided by this invention a heat-curable composition obtained by mixing components comprising (a) 100 parts by weight of an organic-peroxide-curable organopolysiloxane composition, stable in the presence of moisture and curable with heat to an elastomeric solid, and (b) from 0.1 to 10.0 parts by weight of a room-temperature-curable organopolysiloxane composition having silicon-bonded acetoxy radicals, stable in the absence of moisture and curable in the presence of moisture to a coherent rubbery solid; said room-temperature-curable composition being the only source of silicon-bonded acetoxy radicals in the heat-curable composition, there being sufficient silicon-bonded acetoxy radicals in (b) to provide from 0.03 to 0.3 parts by weight of silicon-bonded acetoxy radicals in every 100 parts by weight of the heat-curable composition, said heat-curable composition having better adhesion to an unprimed surface then does the organic-peroxide-curable organopolysiloxane composition.

There is also provided by this invention a method of adhering the composition of this invention to an unprimed surface and an article made by said method.

The composition (a) is any of the organic-peroxide-curable silicone rubber composition which are well known in the art. Many are commercially available. This composition is stable in the presence of moisture at room temperature, but when heated to a curing temperature, either in the presence or absence of moisture, the composition cures to an elastomeric solid.

The organic-peroxide-curable organopolysiloxane composition (a) preferably comprises (i) a benzene-soluble polyorganosiloxane gum having a viscosity of at least 100,000 centipoise at 25° C. and having the average unit formula

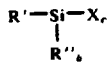

in which each R is selected from the group consisting of monovalent hydrocarbon radicals, each having from 1 to 6 carbon atoms, inclusive, and 3,3,3-trifluoropropyl and $n$ has an average value of from 1.98 to 2.01, (ii) a reinforcing silica filler and (iii) an organic peroxide curing agent.

Benzene-soluble polyorganosiloxane gum (i) is well known in the silicone rubber art. The organic groups of the gum can each be 3,3,3-trifluoropropyl or a monovalent hydrocarbon radical having from 1 to 6 carbon atoms, such as methyl, ethyl, isopropyl, cyclohexyl, vinyl, allyl, cyclopentenyl and phenyl. Conventional polyorganosiloxanes suitable as (i) have siloxane units which are dimethylsiloxane, phenylmethylsiloxane, 3,3,3-trifluoropropylmethylsiloxane, diphenylsiloxane, methylvinylsiloxane or phenylvinylsiloxane or combinations of two or more of said units. It is preferred that at least 50 percent of the total number of R radicals in (i) be methyl radicals. The olefinically unsaturated radicals, such as vinyl, are present in an amount of from 0 to 2 percent of all R radicals and the phenyl radicals are present in from 0 to 10 percent of all R radicals in (i). The 3,3,3-trifluoropropyl radicals can constitute from 0 to 50 percent of all R radicals in (i). The benzene-soluble polyorganosiloxane gums are essentially linear homopolymers, copolymers or their mixtures, having an average $n$ value of from 1.98 to 2.01 silicon-bonded R radicals per silicon atom. It is to be understood that polyorganosiloxanes having trace amounts of $RSiO_{3/2}$ units and $SiO_{4/2}$ units, which are frequently present in commercial polyorganosiloxanes, are within the scope of this invention. The endblocking units of the benzene-soluble polyorganosiloxane (i) are triorganosiloxane units such as trimethylsiloxane, dimethylvinylsiloxane, phenylmethylvinylsiloxane and 3,3,3-trifluoropropyldimethylsiloxane and/or units having silicon bonded hydroxyl groups such as hydroxydiorganosiloxane units such as hydroxydimethylsiloxane, hydroxymethylvinylsiloxane, and hydroxymethylphenylsiloxane. The viscosity of polyorganosiloxane (i) is at least 100,000 centipoise, preferably greater than 1,000,000 centipoise, when measured at 25° C., and can be as high as 50,000,000 centipoise and more. The viscosity of a polyorganosiloxane gum is frequently measured according to ASTM D-926-67 and expressed as Williams plasticity. Suitable polyorganosiloxane gums (i) for the purposes of this invention have Williams plasticities as high as 0.075 inches and more. Benzene-soluble polyorganosiloxane gums (i) can be prepared by any of the well known, suitable methods for preparing endblocked polyorganosiloxane gums.

The reinforcing silica filler (ii) of composition (a) can be any of the high surface area silicas, known as fume silicas, precipitated silicas and silica aerogels. Many are commercially available. These silicas are characterized by an average particle size of from 5 to 50 microns and an average surface area of from 50 to 500 to square meters per gram. Reinforcing silica filler (ii) can be used in the compositions of the invention in the untreated form or the surface of the silica can be pretreated or treated in situ in a well known manner to reduce crepe-hardening, using treating agents such as organosilanes, organopolysiloxanes and organosilazanes. The amount of the reinforcing silica filler in the benzene-soluble polyorganosiloxane gum is not critical. Amounts in the range of from 10 to 200, preferably 20 to 60 parts of reinforcing silica filler per 100 parts of benzene-soluble polyorganosiloxane gum (i) are common in the silicone rubber art and are suitable for the compositions of this invention.

The organic peroxide curing agent (iii) for the composition (a) is well known in the art. The peroxides conventionally used include bis(2,4-dichlorobenzoyl)-peroxide, benzoyl peroxide, di-tertiary-butyl peroxides tertiary-butyl perbenzoate, dicumyl peroxide and 2,5-bis-(tertiary-butyl peroxy)-2,5-dimethylhexane. Other suitable peroxide curing agents are enumerated in the silicone rubber art. From 0.1 to 10, preferably from 0.5 to 3.0 parts by weight of organic peroxide curing agent for every 100 parts by weight of polyorganosiloxane gum (i) is commonly used in the silicone rubber art and is suitable for the purposes of this invention.

In addition to the above-described components, peroxide-cured composition (a) can contain other components which are commonly used in the silicone rubber art such as heat-stability additives, pigments, compression set additives, organic and inorganic fillers, additives to minimize crepe-hardening and additives to improve handling properties of the composition.

The preparation of conventional organic-peroxide-curable silicone rubber compositions is fully described in the art and needs no further elaboration herein. Briefly, solid components are usually added to a mixture of the benzene-soluble polyorganosiloxane gum and liquid components in a mixing device that is capable of being heated. The organic peroxide curing agent is usually added last to the cooled mixture obtained above.

The room-temperature-curable organopolysiloxane composition (b), suitable for use in this invention can be any of the conventional room-temperature-curable silicone elastomer stocks that comprise slicon-bonded acetoxy radicals. Composition (b) is stable so long as it is isolated from water, whether it be liquid water or water vapor. When composition (b) is exposed to water, such as a moist atmosphere, a curing reaction takes place whereby acetic acid is produced and the composition (b) is converted to a coherent rubbery solid.

Preferably the room-temperature-curable organopolysiloxane composition (b) comprises the reaction product of (iv) a hydroxyl-endblocked polyorganosiloxane fluid having a viscosity of less than 100,000 centipoise at 25° C. and (v) an acetoxysilane selected from the group consisting of tetraacetoxysilane and organotriacetoxysilanes. The organic radicals of the fluid (iv) and of the organotriacetoxysilanes can each by any of the R radicals described for (i) above. The amount of acetoxysilane (v) that is used in the reaction with the hydroxyl-endblocked fluid (iv) is sufficient to provide at least one mole, and preferably more than one mole, of acetoxysilane (v) for every mole of silicon-bonded hydroxyl radicals in the fluid (iv).

One of the most preferred room-temperature-curable silicone elastomer stocks, suitable for use as (b), is a composition comprising the reaction product of a polydiorganosiloxane fluid having a viscosity of less than 100,000 centipoise at 25° C. and having terminal radicals which are in part hydroxyl radicals and in part triorganosiloxane radicals, with more than one mole of an acetoxysilane per mole of silicon-bonded hydroxyl radicals in said polydioganosiloxane fluid. The fluid is a mixture of polydiorganosiloxanes consisting essentially of a hydroxyl-endblocked polydioganosiloxane, preferably polydimethylsiloxane, and a polydioganosiloxane, preferably polydimethylsiloxane, being endblocked on one end by a triorganosiloxane unit and on the other end by a hydroxyl group. More than 50 percent, preferably more than 75 percent, of the total endblocks in the mixture are hydroxyl. The acetoxysilane can be tetraacetoxysilane or organotriacetoxysilanes or their mixtures. Each of the organic radicals of the polydiorganosiloxane fluid and of organotriacetoxysilanes are any of the R radicals described for (i) above. Preferably the acetoxysilane is selected from the group consisting of methyltriacetoxysilane, ethyltriacetoxysilane and their mixtures. These compositions can also contain fillers, rheology-control additives, cure-accelerating catalysts, pigments and other commonly used additives of the silicone rubber art. Additional description of these compositions can be found in U.S. Pat. No. 3,274,145 to Wayne P. Dupree which is hereby incorporated by reference to show the preparation of the diorganopolysiloxane fluid having, in part, hydroxy endblocks and, in part, triorganosiloxane endblocks; the preparation of the acetoxysilanes and the preparation of the room-temperature-curable silicone elastomer stock.

Further description of the room-temperature-curable silicone elastomer stock, suitable for use as (b), is a composition of the formula

in which AcO is an acetoxy radical, R is any of the organic radicals described for (i) above, and $m$ is an integer of at least 5. These compositions can also contain fillers and additives common to the silicone rubber art. Additional description of these compositions can be found in U.S. Pat. No. 3,035,016 to Leonard B. Bruner which is hereby incorporated by reference to show the preparation of the acetoxy-bearing compositions and the preparation of the room-temperature-curable silicone elastomer stock.

Additional description of the room-temperature-curable silicone elastomer stock, suitable for use as (b), is the composition as described in U.S. Pat. No. 3,035,016 and shown above with from 0.001 to 10 percent by weight of a carboxylic acid salt of a metal ranging from lead to manganese inclusive in the electromotive series of metals. Details and further description of this composition can be found in U.S. Pat. No. 3,077,465 to Leonard B. Bruner, which is hereby incorporated by reference to show the metal carboxylic acid salts that are suitable for use in this invention.

Other room-temperature-curable silicone elastomer stocks bearing R groups which are operable as component (b) in this invention are the mixed acetoxycarboalkoxy-bearing compositions described in U.S. Pat. Nos. 3,293,204 to Smith, et al.; U.S. Pat. No. 3,296,161 to Kulpa and U.S. Pat. No. 3,647,917 to Schulz, et al.

The aforementioned room-temperature-curable silicone elastomer stocks can be used in this invention as (b) as the room-temperature-curable acetoxy-bearing portion of the composition alone or in combination with one or more of the recited additives common in the art. It is convenient to use one or more of the many commercially available room-temperature-curable silicone elastomer stocks having silicone-bonded acetoxy radicals.

It is well known that acetoxysilanes are reactive with water, either liquid or vapor, at room temperature, i.e. they are hydrolyzable. Acetoxysilanes can be prepared and maintained in the unhydrolyzed form if exacting precautions are taken. Frequently, however, such precautions are not taken in the silicone rubber art. Rather, it is common that excess acetoxysilane is added in the preparation of room-temperature-curable silicone elastomer stocks to allow for small amounts of incidental water thay may contact and hydolyze some of the acetoxysilane. It is to be understood that the acetoxysilanes useful in this invention and their mixtures include not only the unhydrolyzed acetoxysilanes but also the partially hydrolyzed and/or condensed acetoxysilanes that are produced when the acetoxysilanes are exposed to water.

For every 100 parts by weight of organic-peroxide-curable organopolysiloxane composition (a), there is present in the compositions of this invention from 0.1 to 10.0 parts by weight of the room-temperature-curable organopolysiloxane composition (b). It is preferably to use from 1.0 to 5.0 parts by weight of the conventional room-temperature-curable silicone elastomer stocks comprising silicon-bonded acetoxy radicals for every 100 parts by weight of the peroxide-curable silicone rubber composition. Furthermore, whatever the amount of (b), within the stated limits, that is used in 100 parts by weight of (a), there should be sufficient silicon-bonded acetoxy radicals in (b) to provide not less than 0.03 parts by weight nor more than 0.3 parts by weight of silicon-bonded acetoxy radicals for 100 parts by weight of the total heat-curable composition having unprimed adhesion.

In addition to the organic-peroxide-curable organopolysiloxane composition (a) and the room-temperature-curable organopolysiloxane composition (b), it is to be understood that additional quantities of any of the additives that are common to the silicone rubber art and recited above can be added to the mixture of (a) and (b). Thus, it is within the scope of this invention to mix an organic-peroxide-curable silicone rubber composition, the proper amount of a room-temperature-curable silicone elastomer stock having silicon-bonded acetoxy radicals and additives common to the silicone rubber art, in any order, so that there is present in each 100 parts of the total heat-curable composition having unprimed adhesion, from 0.03 to 0.3 parts by weight of silicon-bonded acetoxy radicals.

It is also within the spirit of this invention to mix the appropriate amounts of the benzene-soluble polyorganosiloxane gum (i), the reinforcing silica filler (ii), the organic peroxide curing agent (iii), the hydroxyl-endblocked polyorganosiloxane fluid (iv) and the acetoxysilane (v) and any other additives common to the silicone rubber art to form the heat-curable composition having unprimed adhesion that are compositions of this invention.

In the practice of this invention the appropriate amount of fresh, room-temperature-curable organopolysiloxane composition (b) is mixed with 100 parts by weight of the peroxide-curable organopolysiloxane composition (a). By fresh it is meant that once moisture is no longer excluded from the room-temperature-curable composition, thereby allowing the room-temperature curing reaction to proceed, component (b) should be mixed with component (a) before a significant portion of (b) cures to a gel. Preferably the mixture of (a) and (b) should be formed within approximately 30 minutes, most preferably with 10 minutes after (b) is no longer isolated from water. Additional components of the heat-curable composition having unprimed adhesion can be mixed with the mixture of (a) and (b) at any time prior to the use of said heat-curable compositions.

In the event that the heat-curable compositions of this invention are prepared by mixing the appropriate amounts of the components of (a) and (b), i.e. (i), (ii), (iii), (iv), and (v), it is preferable to mix the portion having silicon-bonded acetoxy radicals last.

Mixing can be accomplished in any suitable manner such as with a two-roll rubber-compounding mill or a dough mixer. It is preferably, but not necessary, to exclude moisture from the heat-curable composition having unprimed adhesion is it is not to be used promptly.

Once the composition having silicon-bonded acetoxy radicals is mixed with the organic-peroxide-curable composition there is produced a heat-curable organopolysiloxane composition having unprimed adhesion. This mixture should be contacted with a substrate and cured as soon after being prepared as possible since maximum adhesion of the mixture to the substrate will be achieved by doing so. However, it is possible to delay, for up to 7 days after mixing, the contacting and curing of the heat-curable mixture having unprimed adhesion to the substrate. A lower adhesion will be obtained from these delayed mixtures, compared to fresh mixtures. Preferably the mixture should be contacted with a substrate and cured within 3 days after being prepared. While the heat-curable compositions of this invention have unprimed adhesion, it is also possible to apply them to primed substrate as well. Furthermore said compositions can be cured to form useful articles without adhering the compositions to a substrate.

The compositions of this invention can be contacted with a substrate by any suitable method such as calendering, spreading, extruding, injecting or pressing to form an assembly comprising the heat-curable compositions of this invention in intimate contact with at least a part of the surface of the substrate. This assembly can be heated in any suitable manner such as by radiant heat, hot air, stream or hot fluid to cure the composition in contact with the substrate to form an article having adhered to at least a part of the surface of the substrate thereof a cured, elastomeric orgnopolysiloxane. Heating of the assembly should be accomplished at a temperature of from 50° to 250° C. Of course the assembly should not be heated so hot as to damage it. The proper temperature and duration of heating will depend upon many factors such as the nature and amount of the organic peroxide that is used, the nature and size of the substrate, the nature and thickness of the heat-curable composition. The practitioner of this invention should determine the best curing conditions by simple routineering.

Because of the elastomeric nature and excellent adhesion of the cured compositions of this invention, they are useful for adhering to many different types of substrates. Suitable solid unprimed substrates to which these compositions can be adhered can be rigid, flexible or elastomeric. Suitable substrate materials include metals such as steel, aluminum, copper and brass; siliceous materials such as masonry, stone, ceramic, glass, brick; natural fibers such as wood and cotton; and synthetic materials such as polyesters, polyamides, epoxy resins, polyacrylates, polyolefins, polycarbonates, and polyorganosiloxanes. Substrates for the article of this invention can be in any suitable form such as films, fabrics and shaped objects. The assemblies can have their final form or they can be further processed, shaped or divided into a desired shape either before or after the assembly is heated to cure the heat-curable composition disposed thereon. The final articles produced by the method of this invention have diverse uses where a silicone rubber must be firmly adhered to a substrate.

The best way to practice this invention is illustrated by the following examples which should not be construed as limiting the invention which is properly delineated in the appended claims. All parts are parts by weight.

EXAMPLE 1

One hundred parts of an organic-peroxide-curable organopolysiloxane composition comprising 100 parts of a benzene-soluble polydiorganosiloxane gum having vinyldimethylsiloxane endblocks and hydroxydimethylsiloxane endblocks and having 0.04 mol percent methylvinylsiloxane units and the remaining units being dimethylsiloxane units and having a Williams plasticity of approximately 0.060 inches at 25° C., 33 parts of a fumed silica having a surface area of 400 sq. meters per gram and 0.75 parts of bis(2,4-dichlorobenzoyl)peroxide was mixed on a two-roll mill with 3 parts of a room-temperature-curable organopolysiloxane composition freshly removed from a closed container and comprising 100 parts of a polydimethylsiloxane fluid having approximately 80% of the fluid with only hydroxyl endblocks and, approximately 20% of the fluid with trimethylsiloxane endblocks and hydroxyl endblocks and having a viscosity of approximately 12,000 centipoise at 25° C, and 6.8 parts of a mixture of methyltriacetoxysilane and ethyltriacetoxysilane. There was approximately 7.5 moles of acetoxysilane for every mole of silicon-bonded hydroxyl in the fluid and approximately 0.09 parts of silicon-bonded acetoxy radicals in the 103 parts of the mixture. A portion of the mixture was immediately calendered onto a polyester film, as received, (available from the E. I. DuPont de Nemours Company of Wilmington DE. as Mylar A) having a thickness of 1 mil to form a 10 mil thick layer of composition on the film. A second portion of the mixture was calendered onto another piece of polyester film 24 hours later. Immediately after being coated the films were heated in an oven at 116° C. for 5 minutes to cure and bond the heat-curable mixture to the film. Another sample of the polyester film was coated with the organic-peroxide-curable composition that had not been mixed with the room-temperature-curable organopolysiloxane composition. This coated film was also immediately heated at 116° C. for 5 minutes.

The resulting cured samples of silicone rubber bonded to polyester film were cut into 1 inch strips and the silicone rubber was peeled from the polyester film for a distance of 1 inch from one end of the strip. The 1 inch polyester film tab was secured into one jaw of an Instron testing machine and the one inch tab of silicone rubber was secured to the second jaw of the test machine. The force required to pull the silicone rubber from the polyester film at an angle of 180° was measured. The control sample, with no room-temperature-curable composition added to the organic-peroxide-curable composition, required a force of 15.7 kilograms per meter to break the bond between silicone rubber and polyester film. The promptly applied and cured composition of this invention required 63.0 kilograms per meter to break the bond between rubber and film. The composition of this invention applied 24 hours after being prepared and promptly cured required 47.0 kilograms per meter to break the bond between silicone rubber and polyester film. All failures were adhesive. Cohesive failure was obtained when the polyester film was cleaned with acetone prior to applying the compositions of this invention.

EXAMPLE 2

When 100 parts of the organic-peroxide-curable organopolysiloxane composition of Example 1 comprising 5 parts of a hydroxyl-endblocked polydimethylsiloxane fluid having a viscosity of approximately 100 centipoise at 25° C. is mixed with 1.5 parts of an acetoxysilane consisting essentially of an equal molar mixture of methyltriacetoxysilane and ethyltriacetoxysilane there is obtained a heat-curable organopolysiloxane composition that has better adhesion to an unprimed solid substitute when contacted and heat-cured thereon than the composition not mixed with said acetoxysilane mixture.

That which is claimed is:

1. A heat-curable composition obtained by mixing components comprising
   a. 100 parts by weight of an organic-peroxide-curable organopolysiloxane composition, stable in the presence of moisture and curable with heat to an elastomeric solid, and
   b. from 0.1 to 10.0 parts by weight of a room-temperature-curable organopolysiloxane composition having silicon-bonded acetoxy radicals, stable in the absence of moisture and curable in the presence of moisture to a coherent rubbery solid; said room-temperature-curable composition being the only source of silicon-bonded acetoxy radicals in the heat-curable composition, there being sufficient silicon-bonded acetoxy radicals in (b) to provide from 0.03 to 0.3 parts by weight of silicon-bonded acetoxy radicals in every 100 parts by weight of the heat-curable composition comprising (a) and (b), said heat-curable composition having better adhesion to an unprimed surface than does the organic-peroxide-curable organopolysiloxane composition.

2. The composition according to claim 1 wherein the organic-peroxide curable organopolysiloxane composition (a) comprises;
   i. a benzene-soluble polyorganosiloxane gum having a viscosity of at least 100,000 centipoise at 25° C. and having the average unit formula $R_nSiO_{(4-n)/2}$ in which each R is selected from the group consisting of monovalent hydrocarbon radicals, each having from 1 to 6 carbon atoms, inclusive, and 3,3,3-trifluoropropyl and $n$ has an average value of from 1.98 to 2.01,
   ii. a reinforcing silica filler and
   iii. an organic peroxide curing agent.

3. The composition according to claim 2 wherein the room-temperature-curable organopolysiloxane composition comprises the reaction product of
   iv. a hydroxyl-endblocked polyorganosiloxane fluid having a viscosity of less than 100,000 centipoise at 25° C. and,
   v. an acetoxysilane selected from the group consisting of tetraacetoxysilane and organotriacetoxysilanes, the organic radicals of the fluid (iv) and the organotriacetoxysilanes being any R as defined for (i) above, there being at least one mole of acetoxysilane (v) for every mole of silicon-bonded hydroxyl radicals in the fluid (iv).

4. The composition according to claim 3 wherein the benzene-soluble polyorganosiloxane gum (i) has a viscosity of greater than 1,000,000 centipoise at 25° C. and consists essentially of from 98 to 100 mol percent of dimethylsiloxane units and from 0 to 2 mol percent of methylvinylsiloxane units and has endblocks selected from the group consisting of triorganosiloxane units and hydroxydiorganosiloxane units the organic groups of endblocking units being any R described for (i); the reinforcing silica filler is present in from 20 to 60 parts by weight of every 100 parts by weight of the benzene-soluble polyorganosiloxane gum (i); and the organic peroxide curing agent is present in from 0.5 to 3.0 parts by weight for every 100 parts by weight of the benzene-soluble polyorganosiloxane gum (i); and the room-temperature-curable organopolysiloxane composition is present in from 1 to 3 parts.

5. The composition according to claim 4 wherein the hydroxyl-endblocked polyorganosiloxane fluid (iv) is a mixture of polydimethylsiloxanes consisting essentially of a polydimethylsiloxane having hydroxyl endblocks and a polydimethylsiloxane being endblocked on one end by a triorganosiloxane unit and on the other end by a hydroxyl group; more than 50 percent of the total endblocks in the mixture being hydroxyl; and the acetoxysilane is selected from the group consisting of methyltriacetoxysilane, ethyltriacetoxysilane and their mixtures, there being more than one mole of acetoxysilane for every silicon-bonded hydroxyl in the mixture of polydimethylsiloxanes.

6. A method comprising
   I. contacting the composition of claim 5 with at least a part of the surface of a substrate within a period of 3 days after said mixing to form an assembly, and
   II. heating the assembly of (I), within a period of three days of said mixing, to a temperature of from 50° to 250° C. to cure the heat-curable composition thereon and to adhere the heat-curable composition to the substrate, thereby producing an article having adhered to at least a part of the surface of the substrate thereof the cured composition of claim 5.

7. The method of claim 6 wherein the substrate is a film of polyester, the organic-peroxide curing agent is bis(2,4-dichlorobenzoyl)peroxide and the assembly is heated at from 100° to 150° C. for from 1 to 15 minutes.

8. The article produced by the method of claim 7.
9. The article produced by the method of claim 6.
10. The cured composition obtained by heating the composition of claim 5.
11. A method comprising
   I. contacting the composition of claim 3 with at least a part of the surface of a substrate within a period of three days after said mixing, to form an assembly, and
   II. heating the assembly of (I) within a period of three days after said mixing to a temperature of from 50° to 250° C. to cure the heat-curable composition thereon and to adhere the heat-curable composition to the substrate, thereby producing an article having adhered to at least a part of the surface of the substrate thereof the cured composition of claim 3.

12. The article produced by the method of claim 11.

13. A method comprising
   I. contacting the composition of claim 1 with at least a part of the surface of a substrate within a period of 1 week after said mixing, thereby forming an assembly, and
   II. heating the assembly of (I) within a period of one week after said mixing to cure the heat-curable composition thereon and to adhere the heat-curable composition to the substrate, thereby producing an article having adhered to at least a part of the surface of the substrate the cured composition of claim 1.

14. The article produced by the method of claim 13.

15. The cured composition obtained by heating the composition of claim 1.

* * * * *